United States Patent
Shen

(10) Patent No.: US 11,703,332 B2
(45) Date of Patent: Jul. 18, 2023

(54) VEHICLE POSITIONING METHOD, APPARATUS, ELECTRONIC DEVICE, VEHICLE AND STORAGE MEDIUM

(71) Applicant: BEIJING BAIDU NETCOM SCIENCE TECHNOLOGY CO., LTD., Beijing (CN)

(72) Inventor: Dayun Shen, Beijing (CN)

(73) Assignee: BEIJING BAIDU NETCOM SCIENCE TECHNOLOGY CO., LTD., Beijing (CN)

(*) Notice: Subject to any disclaimer, the term of this patent is extended or adjusted under 35 U.S.C. 154(b) by 104 days.

(21) Appl. No.: 17/171,999

(22) Filed: Feb. 9, 2021

(65) Prior Publication Data

US 2021/0190510 A1 Jun. 24, 2021

(30) Foreign Application Priority Data

May 25, 2020 (CN) .......................... 202010450278.4

(51) Int. Cl.
*G01C 21/36* (2006.01)
*G01C 21/30* (2006.01)

(52) U.S. Cl.
CPC ......... *G01C 21/30* (2013.01); *G01C 21/3602* (2013.01)

(58) Field of Classification Search
CPC ............... G01C 21/30; G01C 21/3602; G01C 21/165; G01C 21/28; G06F 16/29; G06K 9/6215
See application file for complete search history.

(56) References Cited

U.S. PATENT DOCUMENTS

| 2012/0271540 A1* | 10/2012 | Miksa ..................... G08G 1/167 701/409 |
| 2015/0156744 A1* | 6/2015 | Haro ..................... H04W 4/021 455/456.1 |
| 2015/0233720 A1* | 8/2015 | Harada ..................... G06T 7/73 701/409 |
| 2017/0167883 A1* | 6/2017 | Pink ....................... G01C 21/30 |

(Continued)

FOREIGN PATENT DOCUMENTS

| CN | 110516652 A | * | 11/2019 | ......... G06K 9/00798 |
| CN | 110516652 A | | 11/2019 | |
| CN | 110567480 A | | 12/2019 | |

(Continued)

OTHER PUBLICATIONS

CN110516652A Translation (Year: 2019).*

*Primary Examiner* — Kenneth J Malkowski
*Assistant Examiner* — Ibrahim Abdoalatif Alsomairy
(74) *Attorney, Agent, or Firm* — J.C. Patents

(57) ABSTRACT

Embodiments of the present application disclose a vehicle positioning method, an apparatus, an electronic device, a vehicle and a storage medium, and relate to the field of automatic driving technology. A specific implementation includes: obtaining perceptual information of a lane where a vehicle is located, and obtaining high-precision information of the lane from a preset high-precision map, where the perceptual information and the high-precision information both include lane line information, and both include curb information and/or guardrail information; determining matching information of the perceptual information and the high-precision information; generating position information of the vehicle according to the matching information.

18 Claims, 7 Drawing Sheets

(56) References Cited

U.S. PATENT DOCUMENTS

2017/0350712 A1\* 12/2017 Tateishi ................ G01S 13/89

FOREIGN PATENT DOCUMENTS

| CN | 110869868 A | 3/2020 |
|----|----|----|
| DE | 102017211626 A1 | 1/2019 |
| JP | 2017084137 A | 5/2017 |
| JP | 2017219329 A | 12/2017 |
| WO | WO2015113678 A1 | 8/2015 |

\* cited by examiner

VEHICLE POSITIONING METHOD, APPARATUS, ELECTRONIC DEVICE, VEHICLE AND STORAGE MEDIUM

CROSS-REFERENCE TO RELATED APPLICATIONS

This application claims priority to Chinese Patent Application No. 202010450278.4, filed on May 25, 2020 and entitled "VEHICLE POSITIONING METHOD, APPARATUS, ELECTRONIC DEVICE, VEHICLE AND STORAGE MEDIUM", which is hereby incorporated by reference in its entirety.

TECHNICAL FIELD

Embodiments of the present application relate to the field of artificial intelligence technologies, in particular to the field of automatic driving technologies, and specifically to a vehicle positioning method, an apparatus, an electronic device, a vehicle, and a storage medium.

BACKGROUND

With the development of artificial intelligence technology, the artificial intelligence technology is widely used in various fields, such as the field of automatic driving technology. In order to realize safe and reliable travelling of vehicles, vehicle positioning has become a hot technology.

In the prior art, the vehicle positioning is mainly realized based on a positioning system or various sensors. For example, it is realized based on positioning by matching of laser radar and high-precision map, matching of millimeter-wave radar and high-precision vector map, and other methods.

However, in the process of realizing the present application, inventors found at least the following problem: due to a relatively single matching dimension, accuracy of position information may be relatively low.

SUMMARY

A vehicle positioning method, an apparatus, an electronic device, a vehicle and a storage medium are provided.

According to a first aspect, a vehicle positioning method is provided; the method includes:

obtaining perceptual information of a lane where a vehicle is located, and obtaining high-precision information of the lane from a preset high-precision map, where the perceptual information and the high-precision information both include lane line information, and both include at least one of curb information and guardrail information;

determining matching information of the perceptual information and the high-precision information;

generating position information of the vehicle according to the matching information.

According to a second aspect, an embodiment of the present application provides a vehicle positioning apparatus; the apparatus includes:

an obtaining module, configured to obtain perceptual information of a lane where a vehicle is located, and obtain high-precision information of the lane from a preset high-precision map, where the perceptual information and the high-precision information both include lane line information, and both include at least one of curb information and guardrail information;

a determining module, configured to determine matching information of the perceptual information and the high-precision information;

a generating module, configured to generate position information of the vehicle according to the matching information.

According to a third aspect, an embodiment of the present application provides an electronic device, including:

at least one processor; and a memory communicatively connected to the at least one processor; where, the memory stores instructions executable by the at least one processor, and the instructions are executed by the at least one processor, where the at least one processor is capable of executing the method according to any one of the above embodiments.

According to a fourth aspect, an embodiment of the present application provides a vehicle, where the vehicle includes the apparatus as described above, or includes the electrical device as described above.

According to a fifth aspect, an embodiment of the present application provides a non-transitory computer-readable storage medium, having computer instructions stored thereon, where the computer instructions are used to cause a computer to execute the method according to any one of the above embodiments.

It should be understood that the content described in this section is not intended to identify key or important features of the embodiments of the present disclosure, nor is it intended to limit the scope of the present disclosure. Other features of the present disclosure will be easily understood through the following description.

BRIEF DESCRIPTION OF DRAWINGS

The drawings are used to better understand the solutions, and do not constitute a limitation on the present application, where.

DESCRIPTION OF EMBODIMENTS

Exemplary embodiments of the present application are described below with reference to the accompanying drawings, where various details of the embodiments of the present application are included to facilitate understanding, and should be considered as merely exemplary. Therefore, those of ordinary skill in the art should recognize that various changes and modifications can be made to the embodiments described herein without departing from the scope and spirit of the present application. Similarly, for clarity and conciseness, descriptions of well-known functions and structures are omitted in the following description.

Figure 1:
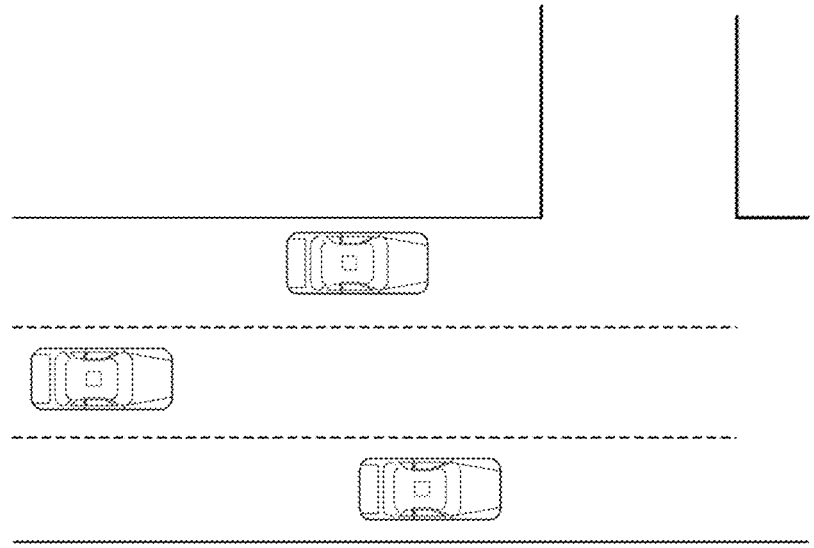
FIG. 1 is a schematic diagram of a scenario of a vehicle positioning method according to an embodiment of the present application.

Please refer to FIG. 1, which is a schematic diagram of a scenario of a vehicle positioning method according to an embodiment of the present application.

As shown in an application scenario shown in FIG. 1, a vehicle is travelling on a road. The vehicle includes a processor (not shown), and the processor can execute a vehicle positioning method of embodiments of the present application to determine position information corresponding to the vehicle, and control travelling of the vehicle according to the position information, for example, controlling the vehicle to decelerate, stop, accelerate, make a turn and so on according to the position information.

Specifically, when the processor determines according to the position information that the vehicle encounters a red light, the processor can control the vehicle to decelerate, or control the vehicle to stop, etc.; when the processor determines according to the position information that a distance between the vehicle and a preceding vehicle is relatively close, the vehicle can be controlled to decelerate; when the processor determines according to the position information that the distance between the vehicle and the preceding vehicle is relatively far, the processor can control the vehicle to accelerate, and so on.

In the related art, a matching is performed on lane line information in perceptual information against lane line information in high-precision information, and the position information of the vehicle is determined according to matching information.

However, if the position information of the vehicle is determined through the lane line information, there may be a situation of a wrong lane line. For example, a vehicle located between a first lane line and a second lane line is determined to be a vehicle located between the second lane line and a third lane line, which leads to a problem of relatively low accuracy of the determined position information.

In order to solve the above technical problems, inventors of the present application acquired, after paying creative efforts, the inventive concept of the present application: to match perceptual information against high-precision information from multiple dimensions to obtain position information with high accuracy and reliability.

The technical solutions of the present application and how the technical solutions of the present application solve the above technical problems will be described in detail below with specific embodiments. The following specific embodiments can be combined with each other, and the same or similar concepts or processes may not be repeated in some embodiments. The embodiments of the present application will be described below in conjunction with the drawings.

According to one aspect of the embodiments of the present application, an embodiment of the present application provides a vehicle positioning method.

Figure 2:
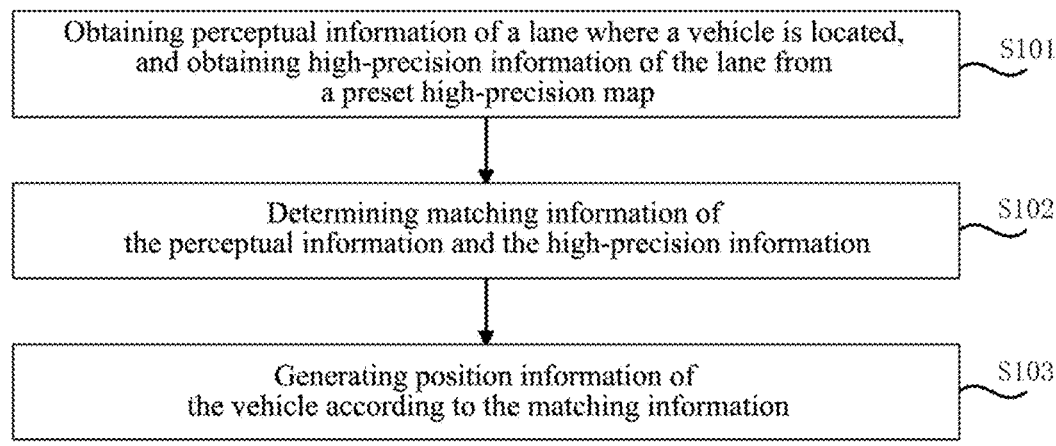
FIG. 2 is a schematic flowchart of a vehicle positioning method according to an embodiment of the present application.

Please refer to FIG. 2, which is a schematic flowchart of a vehicle positioning method according to an embodiment of the present application.

As shown in FIG. 2, the method includes:

S101: obtaining perceptual information of a lane where a vehicle is located, and obtaining high-precision information of the lane from a preset high-precision map, where the perceptual information and the high-precision information both include lane line information, and both include curb information and/or guardrail information.

An executive entity of the embodiment of the present application may be a vehicle positioning apparatus (hereinafter referred to as a positioning apparatus), and the positioning apparatus may specifically be a computer, a server, a processor, a vehicle-mounted terminal, a telematics processor (a vehicle T-BOX), a chip (such as an embedded chip) and others that are disposed on the vehicle.

For example, if the vehicle positioning method of the embodiment of the present application is applied to the application scenario shown in FIG. 1, the executive entity of the vehicle positioning method of the embodiment of the present application may be a processor.

The perceptual information is used to represent information related to vehicle travelling collected by a sensor disposed on the vehicle, which may include the lane line information of the lane where the vehicle is travelling, and may also include the curb information and/or guardrail information of the lane where the vehicle is travelling.

For example, the sensor can be disposed on the vehicle, and the information related to vehicle travelling can be collected by the sensor.

The sensor may include an image collection sensor, such as a camera; the sensor may also include an Inertial measurement unit (IMU), which can detect an attitude angle (or angular velocity) and acceleration of the vehicle; the sensor may also include a radar, and so on.

Now the perceptual information is introduced exemplarily by taking the camera as an example of the sensor.

One or more cameras can be disposed on a front body of the vehicle. Generally, the number of cameras can be determined based on a collection range of the camera. If the collection range of the camera is relatively large, one camera can be disposed on the front body of the vehicle; if the collection range of the camera is relatively small, two cameras can be disposed on the front body of the vehicle. Of course, more cameras can also be disposed. However, considering various issues such as cost, it is preferable to dispose one camera on the front body of the vehicle, or dispose two cameras on the front body of the vehicle.

Of course, in order to improve the reliability and accuracy of the determined position information so as to improve the safety of vehicle travelling, one or more cameras can also be disposed on a left body and a right body of the vehicle. The camera disposed on the left body of the vehicle is used to collect an image of the left side of the vehicle, and the camera disposed on the right body of the vehicle is used to collect an image of the right side of the vehicle. In the same way, the number of cameras disposed on the left body of the vehicle and the number of cameras disposed on the right body of the vehicle can be selected by referring to the description of the above example, which is not repeated here.

If the executive entity of the vehicle positioning method of the embodiment of the present application is the processor, the camera sends an image collected by the camera to the processor, and the processor determines, according to the image, attribute information of the lane where the vehicle is located, such as lane line coordinate information, curb coordinate information and guardrail coordinate information, etc., where the attribute information of the lane is the perceptual information of the lane.

A method of generating the lane line information, the curb information and the guardrail information according to the image can be implemented based on image recognition technology.

It is worth noting that the above example only uses the camera as an example of the sensor to illustrate the perceptual information exemplarily, which should not be understood as a specific limitation on the perceptual information. Based on the above example, it can be known that the type of the sensor may adopt other sensors in the related art, and therefore the perceptual information can also be obtained based on other sensors; and for the obtaining principle thereof, please refer to the above example, which will not be listed here.

The high-precision information is used to represent information related to vehicle travelling determined through the preset high-precision map, which may include the lane line information of the lane where the vehicle is traveling, and may also include the curb information and/or the guardrail information of the lane where the vehicle is traveling.

The vehicle can download and store the high-precision map in advance based on demand. Of course, the vehicle can also load the high-precision map in real time based on demand. In other words, the high-precision map may be stored in the vehicle in advance, or may be downloaded by the vehicle based on demand.

It is worth noting that a positioning system can be disposed on the vehicle, such as a Global Positioning System (GPS) disposed on the vehicle, and the processor can obtain a high-precision map corresponding to GPS positioning information from a memory (which can be a memory disposed inside the processor, or can be a memory disposed outside the processor), and determine the high-precision information according to the high-precision map, that is, determining lane line information, curb information and guardrail information corresponding to the GPS positioning information.

It can be understood that, the high-precision map can include map information of different roads or of different sections of the same road. The high-precision map corresponding to the GPS positioning information is used to represent a high-precision map of a road and a section where the GPS positioning information is located.

S102: determining matching information of the perceptual information and the high-precision information.

The matching information can be used to represent a similarity between the perceptual information and the high-precision information.

Based on the above example, it can be seen that both the perceptual information and the high-precision information include the lane line information, and both include the curb information and/or the guardrail information.

In some embodiments, if the perceptual information includes the lane line information and the curb information, and the high-precision information also includes the lane line information and the curb information, then in this step, the matching information is used to represent matching information that the lane line information based on the perceptual information matches the lane line information of the high-precision map, and that the curb information of the perceptual information matches the curb information of the high-definition map.

In some embodiments, if the perceptual information includes the lane line information and the guardrail information, and the high-precision information also includes the lane line information and the guardrail information, then in this step, the matching information is used to represent matching information that the lane line information based on the perceptual information matches the lane line information of the high-precision map, and that the guardrail information of the perceptual information matches the guardrail information of the high-precision map.

In some embodiments, if the perceptual information includes the lane line information, the curb information and the guardrail information, and the high-precision information also includes the lane line information, the curb information and the guardrail information, then in this step, the matching information is used to represent matching information that the lane line information based on the perceptual information matches the lane line information of the high-precision map, that the curb information of the perceptual information matches the curb information of the high-precision map, and that the guardrail information of the perceptual information matches the guardrail information of the high-precision map.

In the embodiment of the present application, since both the perceptual information and the high-precision information include the lane line information, and both include the curb information and/or the guardrail information, the obtained matching information includes matching information of lane information of multiple dimensions. Compared with the solution of matching through the dimension of the lane line information in the related art, the reliability, accuracy and comprehensiveness of the matching information can be improved, thereby achieving the technical effect of improving reliability of the determined position information, and then achieving the technical effect of safe and reliable vehicle travelling.

S103: generating position information of the vehicle according to the matching information.

Based on the above example, after determining the matching information, a positional relationship of the vehicle with a lane line and a curb can be determined, or a positional relationship of the vehicle with the lane line and a guardrail can be determined, or a positional relationship of the vehicle with the lane line, the curb and the guardrail can be determined. Therefore, the positional information can be determined based on the positional relationship.

Based on the above analysis, it can be seen that the embodiment of the present application provides a vehicle positioning method, which includes: obtaining the perceptual information of the lane where the vehicle is located, and obtaining the high-precision information of the lane from the preset high-precision map, where the perceptual information and the high-precision information both include the lane line information, and both include the curb information and/or the guardrail information; determining the matching information of the perceptual information and the high-precision information; generating the position information of the vehicle according to the matching information. By determining the matching information based on the lane line information, the curb information and/or the guardrail information, the matching information includes matching information of lane information of multiple dimensions, which can improve reliability, accuracy and comprehensiveness of the matching information, thereby achieving the technical effect of reliability of the determined positional information, and then achieving the technical effect of safe and reliable vehicle travelling.

In order to make readers understand the solution of determining the matching information more clearly, a vehicle positioning method according to an embodiment of the present application will be described in more detail with reference to FIG. 3.

Figure 3:
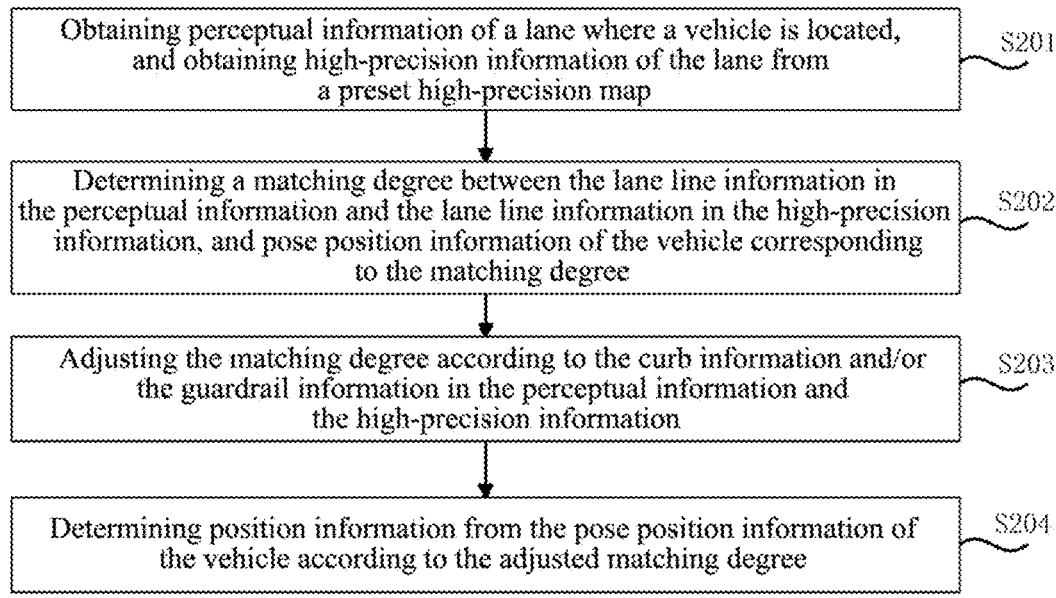
FIG. 3 is a schematic flowchart of a vehicle positioning method according to another embodiment of the present application.

Please refer to FIG. 3, which is a schematic flowchart of a vehicle positioning method according to another embodiment of the present application.

As shown in FIG. 3, the method includes:

S201: obtaining perceptual information of a lane where a vehicle is located, and obtaining high-precision information of the lane from a preset high-precision map, where the perceptual information and the high-precision information both include lane line information, and both include curb information and/or guardrail information.

For the description of S201, please refer to S101, which is not repeated here.

S202: determining a matching degree between the lane line information in the perceptual information and the lane line information in the high-precision information, and pose position information of the vehicle corresponding to the matching degree.

Figure 4:
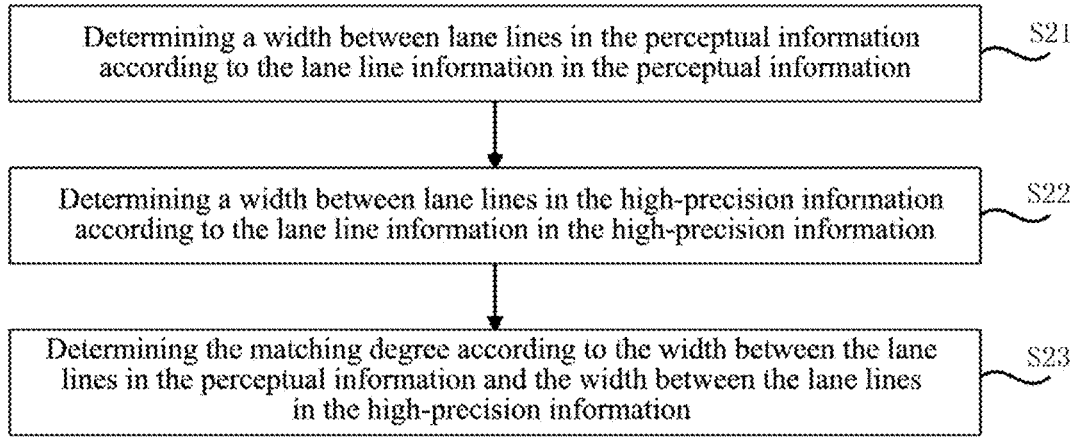
FIG. 4 is a schematic flowchart of a method for determining a matching degree between lane line information in perceptual information and lane line information in high-precision information according to an embodiment of the present application.

With reference to FIG. 4, it can be seen that in some embodiments, the determining the matching degree between the lane line information in the perceptual information and the lane line information in the high-precision information includes:

S21: determining a width between lane lines in the perceptual information according to the lane line information in the perceptual information.

Figure 5:
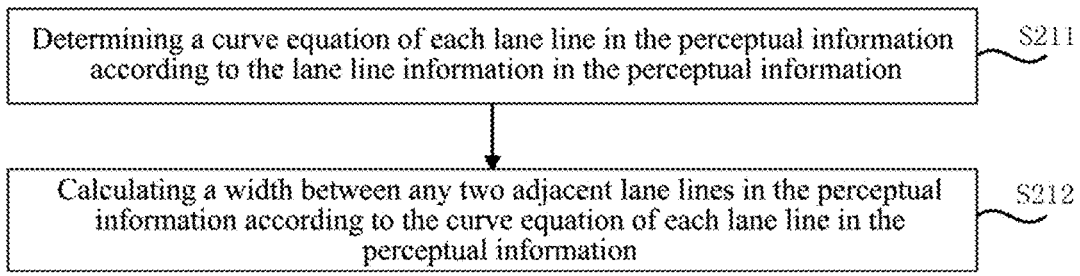
FIG. 5 is a schematic flowchart of a method for determining a width according to an embodiment of the present application.

With reference to FIG. 5, it can be seen that in some embodiments, S21 includes:

S211: determining a curve equation of each lane line in the perceptual information according to the lane line information in the perceptual information.

After obtaining the lane line information in the perceptual information, fitting processing can be performed on the lane line information in the perceptual information to obtain the curve equation. A specific method of fitting processing can be implemented through a fitting algorithm in the prior art, which is not repeated here.

S212: calculating a width between any two adjacent lane lines in the perceptual information according to the curve equation of each lane line in the perceptual information.

It is worth noting that the lane line information includes coordinates of a lane line in the world coordinate system. Therefore, in this step, one or more points with the same ordinate (based on the world coordinate system) can be selected from the curve equation of each lane line, and a distance between any two adjacent lane lines, which is the width between the two adjacent lane lines, can be determined according to coordinates of the selected points.

In the embodiment of the present application, by determining the width between two adjacent lane lines according to the curve equation, accuracy of the determined width can be improved, so as to ensure a technical effect that when the type of the lane line is determined based on the width subsequently, accuracy of the determined type of the lane line is improved.

S22: determining a width between lane lines in the high-precision information according to the lane line information in the high-precision information.

The principle of determining the width between the lane lines in the high-precision information is the same as the principle according to the width between the lane lines in the perceptual information, which is not repeated here.

S23: determining the matching degree according to the width between the lane lines in the perceptual information and the width between the lane lines in the high-precision information.

In the embodiment of the present application, the matching degree is determined based on the width between lane lines, which has a technical effect of improving reliability and accuracy of the matching degree.

Figure 6:
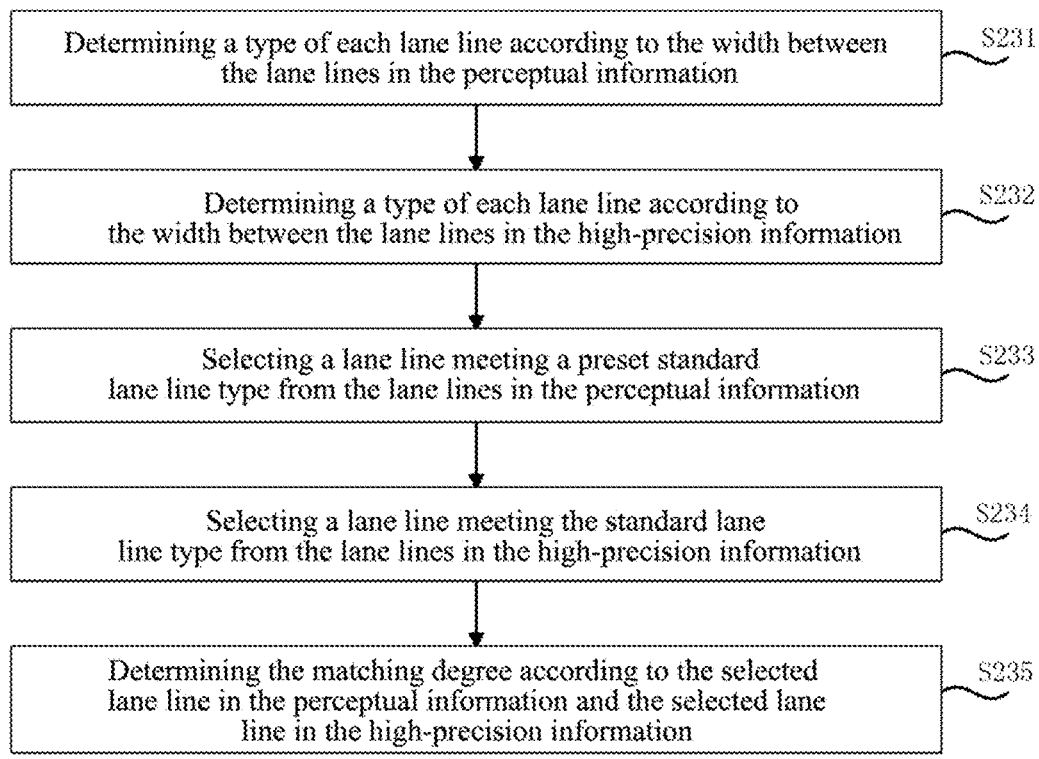
FIG. 6 is a schematic flowchart of a method for determining a matching degree according to a width between lane lines in perceptual information and a width between lane lines in high-precision information according to an embodiment of the present application.

With reference to FIG. 6, it can be seen that in some embodiments, S23 includes:

S231: determining a type of each lane line according to the width between the lane lines in the perceptual information.

In the related art, types of lane lines are generally determined based on character strings, that is, different lane lines are represented by using different character strings. In this proposal, the type of each lane line is determined by the width between the lane lines.

Specifically, the type of the lane can be divided according to the width of the lane. For example, a lane with a lane width greater than or equal to 3 meters is determined as a standard lane, and a lane with a lane width less than 3 meters is determined as a non-standard lane. The standard lane is used to represent a lane where the vehicle is travelling normally, while the non-standard lane can be used to represent an emergency lane.

It is worth noting that in the embodiment of the present application, the type of the lane is determined by the width, which has a technical effect that accuracy and reliability of the determined type can be improved.

S232: determining a type of each lane line according to the width between the lane lines in the high-precision information.

The principle of determining the type of each lane line based on the width between the lane lines in high-precision information is the same as the principle of determining the type of each lane line according to the width between the lane lines in the perceptual information. For the related description thereof, please refer to the above example, which is not repeated here.

S233: selecting a lane line meeting a preset standard lane line type from the lane lines in the perceptual information.

The standard lane is used to represent a lane whose width is greater than or equal to 3 meters. Based on the above example, it can be seen that the standard lane can be used to distinguish with the non-standard lane such as the emergency lane.

That is, in this step, if a certain lane is a standard lane, the lane line corresponding to the standard lane is a lane line meeting the standard lane line type.

Figure 7:
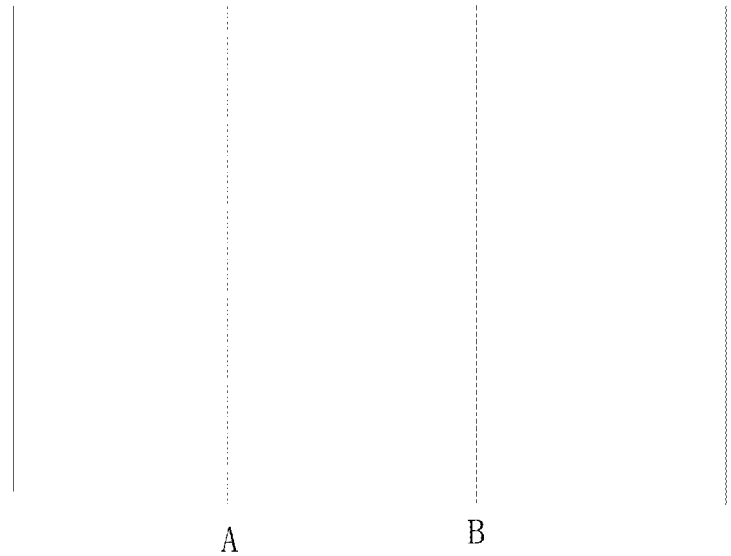
FIG. 7 is a schematic diagram of a lane line in perceptual information according to an embodiment of the present application.

Specifically, the lane line may be represented by a dashed line or a solid line. As shown in FIG. 7, a distribution of lane lines in the perceptual information may be solid line-dashed line-dashed line-solid line. We can denote the solid line and the dashed line by 0 and 1, then the lane lines shown in FIG. 7 can be represented as 0110, and the lane lines selected from FIG. 7 can be marked as A and B.

S234: selecting a lane line meeting the standard lane line type from the lane lines in the high-precision information.

The principle of S234 is the same as that of S233, and is not repeated here.

Figure 8:
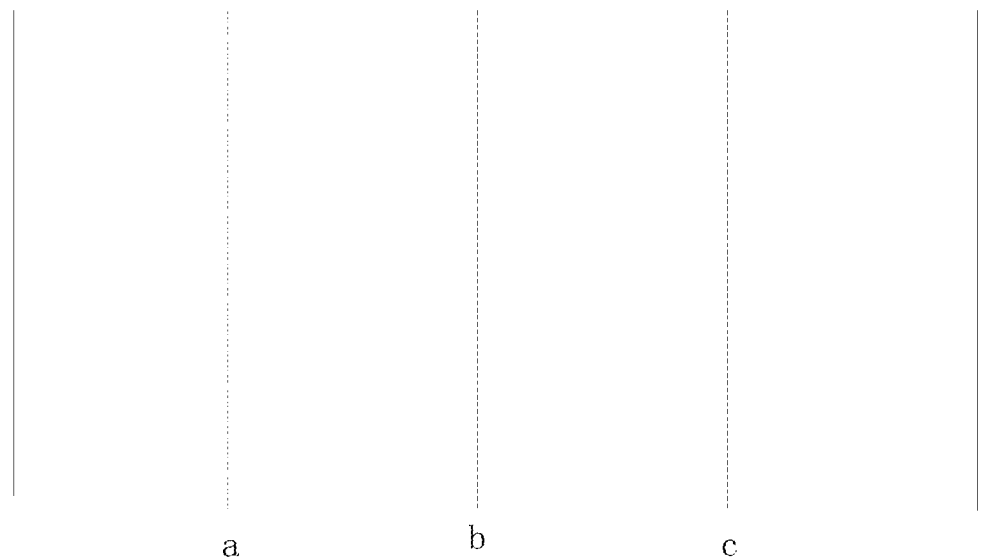
FIG. 8 is a schematic diagram of a lane line in high-precision information according to an embodiment of the present application.

Specifically, as shown in FIG. 8, there are five lane lines in the high-precision information. The lane lines shown in FIG. 8 can be represented as 01110, and the lane lines selected from FIG. 8 can be marked as a, b and c.

The matching degree is determined according to the selected lane line in the perceptual information and the selected lane line in the high-precision information.

S235: determining the matching degree according to the selected lane line in the perceptual information and the selected lane line in the high-precision information.

The matching degree=the number of lane lines in the perceptual information that match the lane lines in the high-precision information/the number of the lane lines in the perceptual information.

Specifically, in conjunction with FIG. 7 and FIG. 8, it can be seen that if the lane line A in the perceptual information is aligned with the lane line a in the high-precision information, there are two lane lines in the perceptual information that match the lane lines in the high-precision information, that is, the lane line A in the perceptual information matches the lane line a in the high-precision information, and the lane line B in the perceptual information matches the lane line b in the high-precision information. The matching degree=2/2=1 at this time.

If the lane line A in the perceptual information is aligned with the lane line b in the high-precision information, there are two lane lines in the perceptual information that match the lane lines in the high-precision information, that is, the lane line A in the perceptual information matches the lane line b in the high-precision information, and the lane line B in the perceptual information matches the lane line c in the high-precision information. The matching degree=2/2=1 at this time.

If the lane line A in the perceptual information is aligned with the lane line c in the high-precision information, there is one lane line in the perceptual information that matches the lane line in the high-precision information, which specifically is, the lane line A in the perceptual information matches the lane line c in the high-precision information. The matching degree=½=0.5 at this time.

It is worth noting that the pose position information of the vehicle corresponding to the matching degree is used to represent rotation and translation of the vehicle corresponding to the matching degree.

Specifically, when the lane line A in the perceptual information is aligned with the lane line a in the high-precision information, there will be a certain deviation between the lane line A in the perceptual information and the lane line a in the high-precision information. Specifically, rotation and translation between the lane line A in the perceptual information and the lane line a in the high-precision information can be calculated, and such rotation and translation can be determined as rotation and translation of the vehicle. A specific calculation method can be realized through coordinates of sampling points, which is not repeated here.

S203: adjusting the matching degree according to the curb information and/or the guardrail information in the perceptual information and the high-precision information.

In other words, this step can be implemented at least in the following manners:

Manner 1: adjusting the matching degree according to the curb information in the perceptual information and the high-precision information.

Manner 2: adjusting the matching degree according to the guardrail information in the perceptual information and the high-precision information.

Manner 3: adjusting the matching degree according to the curb information and the guardrail information in the perceptual information and the high-precision information.

The Manner 3 can be implemented in the following manners:

Manner 1: firstly adjusting the matching degree according to the curb information in the perceptual information and the high-precision information, and then adjusting the adjusted matching degree again according to the guardrail information in the perceptual information and the high-precision information.

Manner 2: firstly adjusting the matching degree according to the guardrail information in the perceptual information and the high-precision information, and then adjusting the adjusted matching degree again according to the curb information in the perceptual information and the high-precision information.

In some embodiments, if the matching degree is P(laneline), then if the matching degree is adjusted according to the curb information in the perceptual information and the high-precision information, it can be realized based on Formula 1. Formula 1:

$$P_{check\_with\_curb} = \begin{cases} P(\text{laneline}) * 2, & \text{yaw}_{R_{curb} - R_{laneline}} < \text{yaw}_{threshold}, T_{curb} - T_{laneline} < T_{threshold} \\ P(\text{laneline}) * 0.5, & \text{else} \end{cases}$$

where $P_{check\_with\_curb}$ is the adjusted matching degree, $\text{yaw}_{R_{curb}}$ is corner information of a curb in a Z-axis direction, $R_{laneline}$ is a rotation matrix determined by the lane line, $\text{yaw}_{threshold}$ is a preset curb corner parameter, $T_{curb}$ is translation information of the curb, $T_{laneline}$ is translation information determined according to the lane line, and $T_{threshold}$ is preset translation information.

In some embodiments, if the matching degree is adjusted according to the guardrail information in the perceptual information and the high-precision information, for the implementation principle thereof, please refer to Formula 1, which is not repeated here.

In other embodiments, if the matching degree is adjusted according to the curb information and the guardrail information in the perceptual information and the high-precision information, the implementation principle may be adding a formula for adjustment based on another information on the basis of Formula 1. The principle of the added formula is the same as that of Formula 1, and will not be listed here.

S204: determining position information from the pose position information of the vehicle according to the adjusted matching degree.

Specifically, the largest matching degree can be determined from matching degrees, and pose position information corresponding to the largest matching degree can be selected as the position information.

For example, based on the above example, it can be seen that there are three matching degrees in combination with FIG. 7 and FIG. 8. After adjusting the three matching degrees based on the above example, three adjusted matching degrees are obtained. The largest matching degree is selected from the three adjusted matching degrees, and the pose position information corresponding to the largest matching degree is determined as the position information.

In the embodiment of the present application, by determining the matching degree between the lane line information in the perceptual information and the lane line information in the high-precision information firstly, and then adjusting the matching degree based on the curb information and/or the guardrail information in the perceptual information and the high-precision information, reliability and accuracy of the matching degree can be improved, thereby achieving the technical effect of improving accuracy and reliability of the position information.

In order to improve the accuracy and reliability of the determined position information, after obtaining the matching degree, a step of adjusting the matching degree is also added in the embodiment of the present application. A vehicle positioning method according to an embodiment of the present application will be described in detail with reference to FIG. 9.

Figure 9:
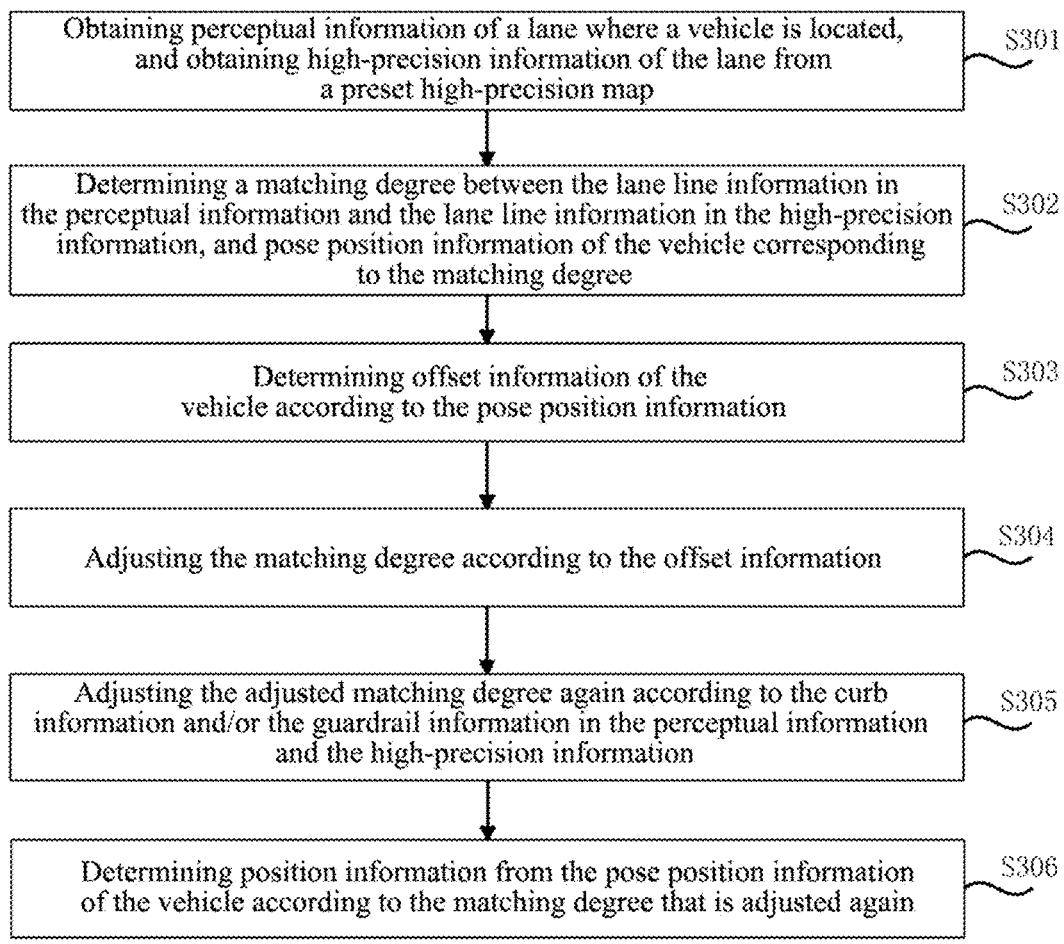
FIG. 9 is a schematic flowchart of a vehicle positioning method according to another embodiment of the present application.

As shown in FIG. 9, the method includes:

S301: obtaining perceptual information of a lane where a vehicle is located, and obtaining high-precision information of the lane from a preset high-precision map, where the perceptual information and the high-precision information both include lane line information, and both include curb information and/or guardrail information.

For the description of S301, please refer to S201, which is not repeated here.

S302: determining a matching degree between the lane line information in the perceptual information and the lane line information in the high-precision information, and pose position information of the vehicle corresponding to the matching degree.

For the description of S302, please refer to S202, which is not repeated here.

S303: determining offset information of the vehicle according to the pose position information.

The offset information is used to represent information of an offset between pose position information of the vehicle in the perceptual information and pose position information of the vehicle in the high-precision information.

S304: adjusting the matching degree according to the offset information.

In some embodiments, an offset probability p(distance) can be determined based on the offset information and Formula 2, and the matching degree can be adjusted according to the offset probability. Formula 2:

$$P(\text{distance}) = \begin{cases} \frac{R_{max} - R}{2 * R_{max}} + \frac{T_{max} - T}{2 * T_{max}} ; R_{max} < R, T_{max} < T \\ 0; \text{else} \end{cases}$$

where $R_{max}$ and $T_{max}$ are preset maximum offset values, R is rotation information, and T is translation information.

S305: adjusting the adjusted matching degree again according to the curb information and/or the guardrail information in the perceptual information and the high-precision information.

For the description of S305, please refer to S203, which is not repeated here.

S306: determining position information from the pose position information of the vehicle according to the matching degree that is adjusted again.

For the description of S306, please refer to S204, which is not repeated here.

In the embodiment of the present application, by adaptively adjusting the matching degree based on the offset information, the accuracy of the matching degree can become higher, so that the reliability of the determined position information can be improved, and the safety of vehicle travelling can be improved.

In order to improve the accuracy and reliability of the determined position information, after the matching degree is obtained, a step of adjusting the matching degree is also added in the embodiment of the present application. A vehicle positioning method according to an embodiment of the present application is now described in detail with reference to FIG. 10.

Figure 10:
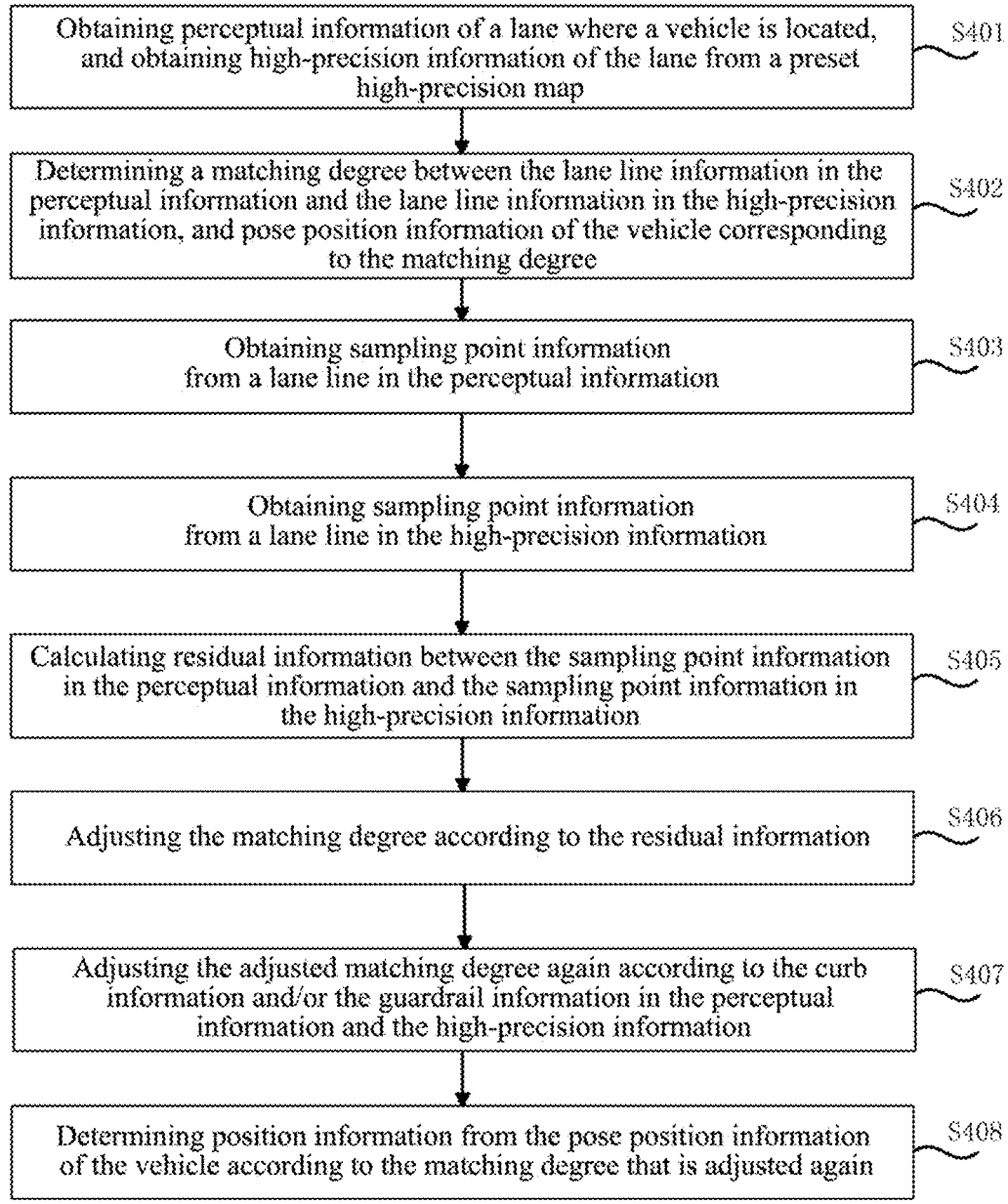
FIG. 10 is a schematic flowchart of a vehicle positioning method according to another embodiment of the present application.

As shown in FIG. 10, the method includes:

S401: obtaining perceptual information of a lane where a vehicle is located, and obtain high-precision information of the lane from a preset high-precision map, where the perceptual information and the high-precision information both include lane line information, and both include curb information and/or guardrail information.

For the description of S401, please refer to S201, which is not repeated here.

S402: determining a matching degree between the lane line information in the perceptual information and the lane line information in the high-precision information, and pose position information of the vehicle corresponding to the matching degree.

For the description of S402, please refer to S202, which is not repeated here.

S403: obtaining sampling point information from a lane line in the perceptual information.

A sampling point may be a point randomly selected from the lane line, or may be a point that is preset on the lane line and has certain specific coordinates for the convenience of calculation. The present application does not limit the selection of the sampling point.

S404: obtaining sampling point information from a lane line in the high-precision information.

The principle of S404 is the same as the principle of S403, and is not repeated here.

S405: calculating residual information between the sampling point information in the perceptual information and the sampling point information in the high-precision information.

In some embodiments, the residual information P(error) may be determined based on a formula. Formula 3:

$$P(\text{error}) = \frac{1}{m} \sum_{i=0}^{m} \left( \text{Point}_{Perception_{sample}} \cdot y - \text{Point}_{hadmap} \cdot y \right)^2$$

where $\text{Point}_{Perception_{sample}} \cdot y$ is the sampling point information in the perceptual information, and specifically is y coordinate information in the world coordinate system, $\text{Point}_{hadmap} \cdot y$ is the sampling point information in the high-precision information, and specifically is y coordinate information in the world coordinate system.

S406: adjusting the matching degree according to the residual information.

Specifically, a product of the residual information and the matching degree is used as the adjusted matching degree.

S407: adjusting the adjusted matching degree again according to the curb information and/or the guardrail information in the perceptual information and the high-precision information.

For the description of S407, please refer to S203, which is not repeated here.

S408: determining position information from the pose position information of the vehicle according to the matching degree that is adjusted again.

For the description of S408, please refer to S204, which is not repeated here.

It is worth noting that in some embodiments, the matching degree can also be adjusted based on the offset information and the residual information, and the above example can be referred to for the principle of adjustment.

Specifically, the matching degree can be adjusted based on the offset information first, and then the adjusted matching degree can be adjusted based on the residual information; or the matching degree can be adjusted based on the residual information first, and then the adjusted matching degree can be adjusted based on the offset information.

In the embodiment of the present application, by adaptively adjusting the matching degree based on the residual information, the accuracy of the matching degree can become higher, so that the reliability of the determined position information can be improved, and the safety of vehicle travelling can be improved.

It is worth noting that roads can be divided into structured roads and unstructured roads, where the unstructured roads are used to represent those with special lane lines, such as with simple lane lines, non-passing ramp entrances/exits, non-diversion areas, etc.

In some embodiments, after the position information is determined, it can be determined whether the vehicle is located on a structured road or an unstructured road. If it is determined that the vehicle is located on a structured road, prompt information can be sent, where the prompt information is used to prompt the user to turn on an automatic driving function of the vehicle.

According to another aspect of the embodiments of the present application, an embodiment of the present application also provides a vehicle positioning apparatus, which is used to perform the method shown in any of the above embodiments, for example, to perform the methods shown in FIG. 2, FIG. 3, FIG. 4, FIG. 5, FIG. 6, FIG. 9 and FIG. 10.

Figure 11:
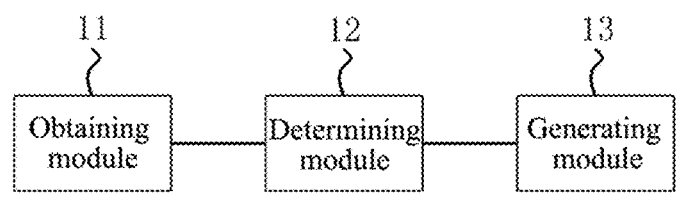
FIG. 11 is a schematic diagram of a vehicle positioning apparatus according to an embodiment of the present application.

Please refer to FIG. 11, which is a schematic diagram of a vehicle positioning apparatus according to an embodiment of the present application.

As shown in FIG. 11, the apparatus includes:

an obtaining module 11, configured to obtain perceptual information of a lane where a vehicle is located, and obtain high-precision information of the lane from a preset high-precision map, where the perceptual information and the high-precision information both include lane line information, and both include curb information and/or guardrail information;

a determining module 12, configured to determine matching information of the perceptual information and the high-precision information;

a generating module 13, configured to generate position information of the vehicle according to the matching information.

In some embodiments, the determining module 12 is configured to determine a matching degree between the lane line information in the perceptual information and the lane line information in the high-precision information, and pose position information of the vehicle corresponding to the matching degree, and adjust the matching degree according to the curb information and/or the guardrail information in the perceptual information and the high-precision information;

and, the generating module 13 is configured to determine the position information from pose position information of the vehicle according to the adjusted matching degree.

In some embodiments, the determining module 12 is configured to determine a width between lane lines in the perceptual information according to the lane line information in the perceptual information; determine a width between lane lines in the high-precision information according to the lane line information in the high-precision information; and determine the matching degree according to the width between the lane lines in the perceptual information and the width between the lane lines in the high-precision information.

In some embodiments, the determining module 12 is configured to determine a type of each lane line according to the width between the lane lines in the perceptual information; determine a type of each lane line according to the width between the lane lines in the high-precision information; select a lane line meeting a preset standard lane line type from the lane lines in the perceptual information; select a lane line meeting the standard lane line type from the lane lines in the high-precision information; and determine the matching degree according to the selected lane line in the perceptual information and the selected lane line in the high-precision information.

In some embodiments, the determining module 12 is configured to determine a curve equation of each lane line in the perceptual information according to the lane line information in the perceptual information; calculate a width between any two adjacent lane lines in the perceptual information according to the curve equation of each lane line in the perceptual information.

In some embodiments, the determining module 12 is configured to determine offset information of the vehicle according to the pose position information; adjust the matching degree according to the offset information.

In some embodiments, the determining module 12 is configured to obtain sampling point information from a lane line in the perceptual information; obtain sampling point information from a lane line in the high-precision information; calculate residual information between the sampling point information in the perceptual information and the sampling point information in the high-precision information; and adjust the matching degree according to the residual information.

According to embodiments of the present application, the present application also provides an electronic device and a readable storage medium.

Figure 12:
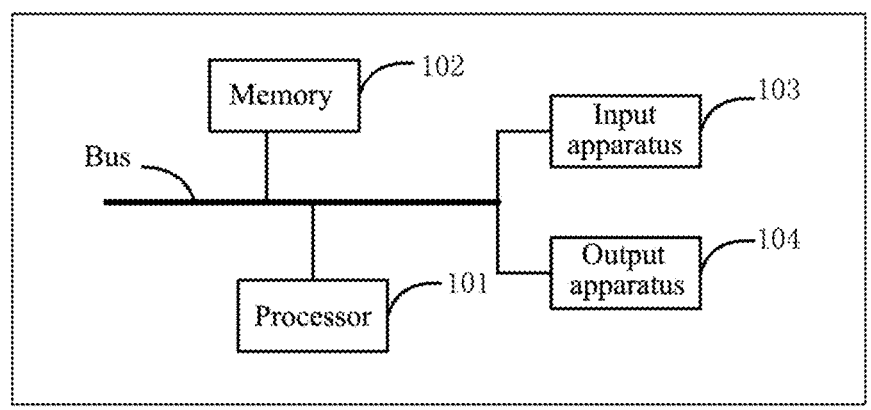
FIG. 12 is a block diagram of an electronic device according to an embodiment of the present application.

Please refer to FIG. 12, which is a block diagram of an electronic device according to an embodiment of the present application.

The electronic device is intended to represent various forms of digital computers, such as a laptop computer, a desktop computer, a workstation, a personal digital assistant, a server, a blade server, a mainframe computer, and other suitable computers. The electronic device can also represent various forms of mobile devices, such as a personal digital assistant, a cellular phone, a smart phone, a wearable device and other similar computing devices. The components shown herein as well as their connections and relationships and their functions are merely examples, and are not intended to limit the implementation of the embodiments of the present application described and/or claimed herein.

As shown in FIG. 12, the electronic device includes: one or more processors 101, a memory 102, and interfaces for connecting various components, including high-speed interfaces and low-speed interfaces. The various components are connected to each other by different buses, and can be installed on a common main board or mounted in other ways as required. The processor may process instructions executed within the electronic device, including instructions stored in or on the memory to display GUI graphical information on an external input/output apparatus (such as a display device coupled to an interface). In other implementations, multiple processors and/or multiple buses may be used with multiple memories, if needed. Similarly, multiple electronic devices can be connected, and each device provides some necessary operations (for example, as a server array, a group of blade servers, or a multiprocessor system). One processor 101 is taken as an example in FIG. 12.

The memory 102 is the non-transitory computer readable storage medium provided in the embodiments of the present application. The memory stores instructions executable by at least one processor to cause the at least one processor to execute the vehicle positioning method provided by the embodiments of the present application. The non-transitory computer readable storage medium of the embodiments of the present application stores computer instructions for causing a computer to execute the vehicle positioning method provided by the embodiments of the present application.

As a non-transitory computer readable storage medium, the memory 102 can be used for storing non-transitory software programs, non-transitory computer executable programs and modules, such as program instructions/modules in the embodiments of the present application. The processor 101 executes various functional applications and data processing of a server by running non-transitory software programs, instructions and modules stored in the memory 102, that is, realizing the vehicle positioning method in the method embodiments described above.

The memory 102 can include a program storing area and a data storing area, where the program storing area may store an operating system, an application program required by at least one function; the data storing area can store data created according to the use of the electronic device, etc. In addition, the memory 102 can include a high-speed random access memory, and may further include a non-transitory memory, such as at least one disk memory device, a flash memory device, or other non-transitory solid-state memory devices. In some embodiments, the memory 102 may optionally include memories remotely located with respect to the processor 101, and these remote memories may be connected to the electronic device through a network. Examples of the network described above includes but are not limited to, the Internet, an intranet, a local area network, a Block-chain-based Service Network (BSN), a mobile communication network and combinations thereof.

The electronic device can further include: an input apparatus 103 and an output apparatus 104. The processor 101, the memory 102, the input apparatus 103, and the output apparatus 104 may be connected by a bus or other means. A connection by a bus is taken as an example in FIG. 12.

The input apparatus 103 can receive inputted digital or character information, and generate a key signal input related to user setting and function control of the electronic device, such as a touch screen, a keypad, a mouse, a track pad, a touch pad, an indicator stick, one or more mouse buttons, a trackball, a joystick and other input apparatuses. The output apparatus 104 may include a display device, an auxiliary lighting apparatus (e.g., an LED), a tactile feedback device (e.g., a vibration motor), etc. The display device may include, but is not limited to, a liquid crystal display (LCD), a light emitting diode (LED) display, and a plasma display. In some implementations, the display device may be a touch screen.

The various embodiments of the systems and techniques described herein may be implemented in digital electronic circuit systems, integrated circuit systems, dedicated ASIC (application specific integrated circuits), computer hardware, firmware, software, and/or combinations thereof. These various implementations may include: being implemented in one or more computer programs that can be executed and/or interpreted on a programmable system including at least one programmable processor. The programmable processor may be a special or general programmable processor, and can receive data and instructions from a storage system, at least one input apparatus and at least one output apparatus, and transmit data and instructions to the storage system, the at least one input apparatus and the at least one output apparatus.

These computing programs (also called programs, software, software applications, or codes) include machine instructions of programmable processors, and can be implemented using high-level procedures and/or object-oriented programming languages, and/or assembly/machine languages. As used herein, the terms "machine-readable medium" and "computer-readable medium" refer to any computer program product, device, and/or apparatus (e.g., a magnetic disk, an optical disk, a memory, a programmable logic device (PLD)) for providing machine instructions and/or data to a programmable processor, including a machine-readable medium that receives machine instructions as machine-readable signals. The term "machine-readable signal" refers to any signal used for providing machine instructions and/or data to a programmable processor.

To provide interaction with users, the systems and techniques described herein can be implemented on a computer which has: a display device (e.g., a CRT (cathode ray tube) or LCD (liquid crystal display) monitor) for displaying information to users; as well as a keyboard and a pointing apparatus (e.g., a mouse or a trackball) through which users can provide inputs to the computer. Other kinds of apparatuses can also be used to provide interaction with users, for example, a feedback provided to a user can be any form of sensory feedback (e.g., visual feedback, auditory feedback, or tactile feedback); and can receive inputs from users in any form (including acoustic input, voice input or tactile input).

The systems and techniques described herein can be implemented in a computing system including background components (e.g., as a data server), or a computing system including middleware components (e.g., an application server), or a computing system including front-end components (e.g., a user computer with a graphical user interface or a web browser through which users can interact with implementations of the systems and techniques described herein), or a computing system including any combination of such background components, middleware components or front-end components. Components of the system can be connected to each other through digital data communication in any form or medium (e.g., a communication network). Examples of the communication network include: a local area networks (LAN), a Block-chain-based Service Network (BSN), a wide area network (WAN) and the Internet.

A computer system may include a client and a server. The client and server are generally remote from each other and usually interact through a communication network. A relationship between the client and the server is generated by computer programs running on corresponding computers and having a client-server relationship with each other.

According to another aspect of the embodiments of the present application, an embodiment of the present application also provides a vehicle, which includes the vehicle positioning apparatus described in any of the foregoing embodiments, or includes the electronic device described in the foregoing embodiment.

It should be understood that steps can be reordered, added or deleted for the various forms of processes shown above. For example, the steps described in the present application can be executed in parallel, sequentially or in a different order, so long as the desired result of the technical solution disclosed in the present application can be achieved, which is not limited herein.

The above specific implementations do not constitute a limitation to the protection scope of the present application. It should be understood by those skilled in the art that various modifications, combinations, sub-combinations, and substitutions may be performed according to design requirements and other factors. Any modification, equivalent substitution, improvement and others that are made within the spirit and principle of the present application shall be included in the protection scope of the present application.

What is claimed is:

1. A vehicle positioning method, comprising:
   obtaining perceptual information of a lane where a vehicle is located, and obtaining high-precision information of the lane from a preset high-precision map, wherein the perceptual information and the high-precision information both comprise lane line information, and both comprise at least one of curb information and guardrail information;
   determining matching information of the perceptual information and the high-precision information;
   generating position information of the vehicle according to the matching information;
   controlling travelling of the vehicle according to the position information;
   wherein the determining the matching information of the perceptual information and the high-precision information comprises:
   determining a matching degree between the lane line information in the perceptual information and the lane line information in the high-precision information, and pose position information of the vehicle corresponding to the matching degree;
   determining offset information of the vehicle according to the pose position information, wherein the offset information is information of an offset between pose position information of the vehicle in the perceptual information and pose position information of the vehicle in the high-precision information;
   adjusting the matching degree according to the offset information;
   wherein the adjusting the matching degree according to the offset information comprises:
   determining an offset probability P(distance) based on the offset information and $$P(\text{distance}) = \begin{cases} \dfrac{R_{max} - R}{2 * R_{max}} + \dfrac{T_{max} - T}{2 * T_{max}}; & R_{max} < R, T_{max} < T, \\ 0; & \text{else} \end{cases}$$

adjusting the matching degree according to the offset probability;
   wherein $R_{max}$ is a preset maximum offset value for rotation information, $T_{max}$ is a preset maximum offset value for translation information, R is rotation information, T is translation information, and the offset information comprises R and T.

2. The method according to claim 1, wherein after the adjusting the matching degree according to the offset information, the method further comprises:
   adjusting the matching degree again according to at least one of the curb information and the guardrail information in the perceptual information and the high-precision information; and
   the generating the position information of the vehicle according to the matching information comprises:
   determining the position information from the pose position information of the vehicle according to the adjusted matching degree.

3. The method according to claim 1, wherein the determining the matching degree between the lane line information in the perceptual information and the lane line information in the high-precision information comprises:
   determining a width between lane lines in the perceptual information according to the lane line information in the perceptual information;
   determining a width between lane lines in the high-precision information according to the lane line information in the high-precision information;
   determining the matching degree according to the width between the lane lines in the perceptual information and the width between the lane lines in the high-precision information.

4. The method according to claim 3, wherein the determining the matching degree according to the width between the lane lines in the perceptual information and the width between the lane lines in the high-precision information comprises:
   determining a type of each lane line according to the width between the lane lines in the perceptual information;
   determining a type of each lane line according to the width between the lane lines in the high-precision information;
   selecting a lane line meeting a preset standard lane line type from the lane lines in the perceptual information;
   selecting a lane line meeting the standard lane line type from the lane lines in the high-precision information;
   determining the matching degree according to the selected lane line in the perceptual information and the selected lane line in the high-precision information.

5. The method according to claim 3, wherein the determining the width between the lane lines in the perceptual information according to the lane line information in the perceptual information comprises:
   determining a curve equation of each lane line in the perceptual information according to the lane line information in the perceptual information;
   calculating a width between any two adjacent lane lines in the perceptual information according to the curve equation of each lane line in the perceptual information.

6. The method according to claim 2, wherein before adjusting the matching degree according to at least one of the curb information and the guardrail information in the perceptual information and the high-precision information, the method further comprises:
   obtaining sampling point information from a lane line in the perceptual information;
   obtaining sampling point information from a lane line in the high-precision information;
   calculating residual information between the sampling point information in the perceptual information and the sampling point information in the high-precision information;
   adjusting the matching degree according to the residual information.

7. A vehicle positioning apparatus, comprising:
   at least one processor; and
   a memory communicatively connected to the at least one processor; wherein,
   the memory stores instructions executable by the at least one processor, and the instructions are executed by the at least one processor, wherein the at least one processor is configured to:
   obtain perceptual information of a lane where a vehicle is located, and obtain high-precision information of the lane from a preset high-precision map, wherein the perceptual information and the high-precision information both comprise lane line information, and both comprise at least one of curb information and guardrail information;
   determine matching information of the perceptual information and the high-precision information;
   generate position information of the vehicle according to the matching information;
   control travelling of the vehicle according to the position information;
   wherein the at least one processor is configured to:
   determine a matching degree between the lane line information in the perceptual information and the lane line information in the high-precision information, and pose position information of the vehicle corresponding to the matching degree;
   determine offset information of the vehicle according to the pose position information, wherein the offset information is information of an offset between pose position information of the vehicle in the perceptual information and pose position information of the vehicle in the high-precision information;
   adjust the matching degree according to the offset information;
   wherein the at least one processor is configured to:
   determine an offset probability P(distance) based on the offset information and $$P(\text{distance}) = \begin{cases} \dfrac{R_{max} - R}{2 * R_{max}} + \dfrac{T_{max} - T}{2 * T_{max}}; & R_{max} < R, T_{max} < T, \\ 0; & \text{else} \end{cases}$$

matching degree according to the offset probability;
wherein $R_{max}$ is a preset maximum offset value for rotation information, $T_{max}$ is a preset maximum offset value for translation information, R is rotation information, T is translation information, and the offset information comprises R and T.

8. The apparatus according to claim 7, wherein the at least one processor is configured to:
   adjust the matching degree again according to at least one of the curb information and the guardrail information in the perceptual information and the high-precision information; and
   determine the position information from the pose position information of the vehicle according to the adjusted matching degree.

9. The apparatus according to claim 7, wherein the at least one processor is configured to determine a width between lane lines in the perceptual information according to the lane line information in the perceptual information; determine a width between lane lines in the high-precision information according to the lane line information in the high-precision information; determine the matching degree according to the width between the lane lines in the perceptual information and the width between the lane lines in the high-precision information.

10. The apparatus according to claim 9, wherein the at least one processor is configured to determine a type of each lane line according to the width between the lane lines in the perceptual information; determine a type of each lane line according to the width between the lane lines in the high-precision information; select a lane line meeting a preset standard lane line type from the lane lines in the perceptual information; select a lane line meeting the standard lane line type from the lane lines in the high-precision information; and determine the matching degree according to the selected lane line in the perceptual information and the selected lane line in the high-precision information.

11. The apparatus according to claim 9, wherein the at least one processor is configured to determine a curve equation of each lane line in the perceptual information according to the lane line information in the perceptual information; calculate a width between any two adjacent lane lines in the perceptual information according to the curve equation of each lane line in the perceptual information.

12. The apparatus according to claim 8, wherein the at least one processor is configured to obtain sampling point information from a lane line in the perceptual information; obtain sampling point information from a lane line in the high-precision information; calculate residual information between the sampling point information in the perceptual information and the sampling point information in the high-precision information; adjust the matching degree according to the residual information.

13. A vehicle, comprising the vehicle positioning apparatus according to claim 7.

14. The vehicle according to claim 13, wherein the at least one processor of the apparatus is configured to:
   adjust the matching degree again according to at least one of the curb information and the guardrail information in the perceptual information and the high-precision information; and
   determine the position information from the pose position information of the vehicle according to the adjusted matching degree.

15. The vehicle according to claim 13, wherein the at least one processor of the apparatus is configured to determine a width between lane lines in the perceptual information according to the lane line information in the perceptual information; determine a width between lane lines in the high-precision information according to the lane line information in the high-precision information; determine the matching degree according to the width between the lane lines in the perceptual information and the width between the lane lines in the high-precision information.

16. The vehicle according to claim 15, wherein the at least one processor of the apparatus is configured to determine a type of each lane line according to the width between the lane lines in the perceptual information; determine a type of each lane line according to the width between the lane lines in the high-precision information; select a lane line meeting a preset standard lane line type from the lane lines in the perceptual information; select a lane line meeting the standard lane line type from the lane lines in the high-precision information; and determine the matching degree according to the selected lane line in the perceptual information and the selected lane line in the high-precision information.

17. The vehicle according to claim 15, wherein the at least one processor of the apparatus is configured to determine a curve equation of each lane line in the perceptual information according to the lane line information in the perceptual information; calculate a width between any two adjacent lane lines in the perceptual information according to the curve equation of each lane line in the perceptual information.

18. A non-transitory computer-readable storage medium, having computer instructions stored thereon, wherein the computer instructions are used to cause a computer to execute the method according to claim 1.

* * * * *